(12) United States Patent
Berlinger

(10) Patent No.: US 9,776,650 B1
(45) Date of Patent: Oct. 3, 2017

(54) HAND TRUCK EXCHANGEABLE TOOL ATTACHMENT METHOD

(71) Applicant: Darryl Edward Berlinger, Doyelstown, PA (US)

(72) Inventor: Darryl Edward Berlinger, Doyelstown, PA (US)

(*) Notice: Subject to any disclaimer, the term of this patent is extended or adjusted under 35 U.S.C. 154(b) by 0 days.

(21) Appl. No.: 15/481,104

(22) Filed: Apr. 6, 2017

Related U.S. Application Data

(63) Continuation of application No. 14/677,968, filed on Apr. 2, 2015, now Pat. No. 9,643,631.

(60) Provisional application No. 61/973,920, filed on Apr. 2, 2014.

(51) Int. Cl.
*B62B 1/14* (2006.01)
*B62B 1/12* (2006.01)
*B62B 1/00* (2006.01)

(52) U.S. Cl.
CPC ............... *B62B 1/12* (2013.01); *B62B 1/002* (2013.01); *B62B 1/008* (2013.01); *B62B 2206/006* (2013.01)

(58) Field of Classification Search
CPC ........... B62B 1/12; B62B 1/002; B62B 1/008; B62B 1/14; B62B 2203/10
See application file for complete search history.

(56) References Cited

U.S. PATENT DOCUMENTS

| 3,052,323 | A | * | 9/1962 | Hopfeld | B62B 1/14 |
| | | | | | 187/231 |
| 3,647,238 | A | * | 3/1972 | Mackey | B62B 1/14 |
| | | | | | 280/47.17 |
| 3,870,177 | A | * | 3/1975 | Cobb | B62B 1/14 |
| | | | | | 414/446 |
| 3,927,898 | A | * | 12/1975 | Weyrauch | B62B 1/12 |
| | | | | | 280/47.27 |
| 3,939,999 | A | * | 2/1976 | Nielson | B62B 1/14 |
| | | | | | 280/47.27 |
| 5,123,666 | A | * | 6/1992 | Moore | B62B 1/14 |
| | | | | | 280/47.18 |
| 5,465,987 | A | * | 11/1995 | DellaVecchia | B62B 1/14 |
| | | | | | 280/47.18 |
| 6,059,512 | A | * | 5/2000 | Kielinski | B62B 5/0089 |
| | | | | | 280/47.18 |

(Continued)

*Primary Examiner* — Brian Swenson
*Assistant Examiner* — Jacob Meyer

(57) ABSTRACT

A hand truck includes a quick release/attach mechanism operating according to a method for quickly and easily exchanging various tools with the hand truck, the quick release/latch mechanism including biased locking pins movably located within tubular frame members integral to the hand truck and proximal holes in the tubular frame members for receiving a projection member of the tool and spaced a predetermined distance from a hangar portion of the tool and wherein the hangar portion may be hung on a crossbar of the tubular frame and then the projection members of the tool may be coupled with and retained by the locking pins of the tubular frame. The arrangement requires no hand tools such as wrenches or screwdrivers, and no external fasteners such as pins or bolts. The geometry of the cross bars on the hand truck allow tool attachments to be captured or releases simply by tilting the hand truck forward or backward. The tool attachments are then locked to the truck by locking rods and pins that operate inside the two main tubes of the hand truck.

2 Claims, 7 Drawing Sheets

(56) References Cited

U.S. PATENT DOCUMENTS

| | | | | |
|---|---|---|---|---|
| 6,247,710 B1* | 6/2001 | Luberda | ............... | B62B 1/14 280/47.18 |
| 6,309,168 B1* | 10/2001 | Holmes | ............... | B62B 1/14 414/444 |
| 6,357,063 B1* | 3/2002 | Selby | ............... | A61G 5/00 280/47.131 |
| 6,382,642 B1* | 5/2002 | Rainey | ............... | B62B 1/264 280/47.24 |
| 6,601,859 B2* | 8/2003 | Durham | ............... | B62B 1/12 280/47.131 |
| 6,663,136 B2* | 12/2003 | Stevens | ............... | B60D 1/075 280/47.27 |
| 6,880,835 B2* | 4/2005 | Tornabene | ............... | B62B 1/002 182/20 |
| 7,914,017 B2* | 3/2011 | Setzer, Sr. | ............... | B62B 1/10 280/47.17 |
| 8,152,180 B2* | 4/2012 | Anspach | ............... | B62B 1/12 280/47.27 |
| 8,550,476 B1* | 10/2013 | Whinnery | ............... | B62B 1/12 280/47.18 |
| 2002/0140191 A1* | 10/2002 | Knowlton | ............... | B62B 1/264 280/47.29 |
| 2011/0276181 A1* | 11/2011 | Lamb | ............... | B62B 1/14 700/275 |
| 2012/0153585 A1* | 6/2012 | Ryan | ............... | B62B 1/002 280/47.18 |
| 2012/0153587 A1* | 6/2012 | Ryan | ............... | B62B 1/12 280/47.27 |
| 2013/0223971 A1* | 8/2013 | Grace, IV | ............... | B65D 25/005 414/809 |
| 2014/0001721 A1* | 1/2014 | Benko | ............... | B62B 5/025 280/47.28 |
| 2015/0284016 A1* | 10/2015 | Berlinger | ............... | B62B 1/002 280/47.18 |

* cited by examiner

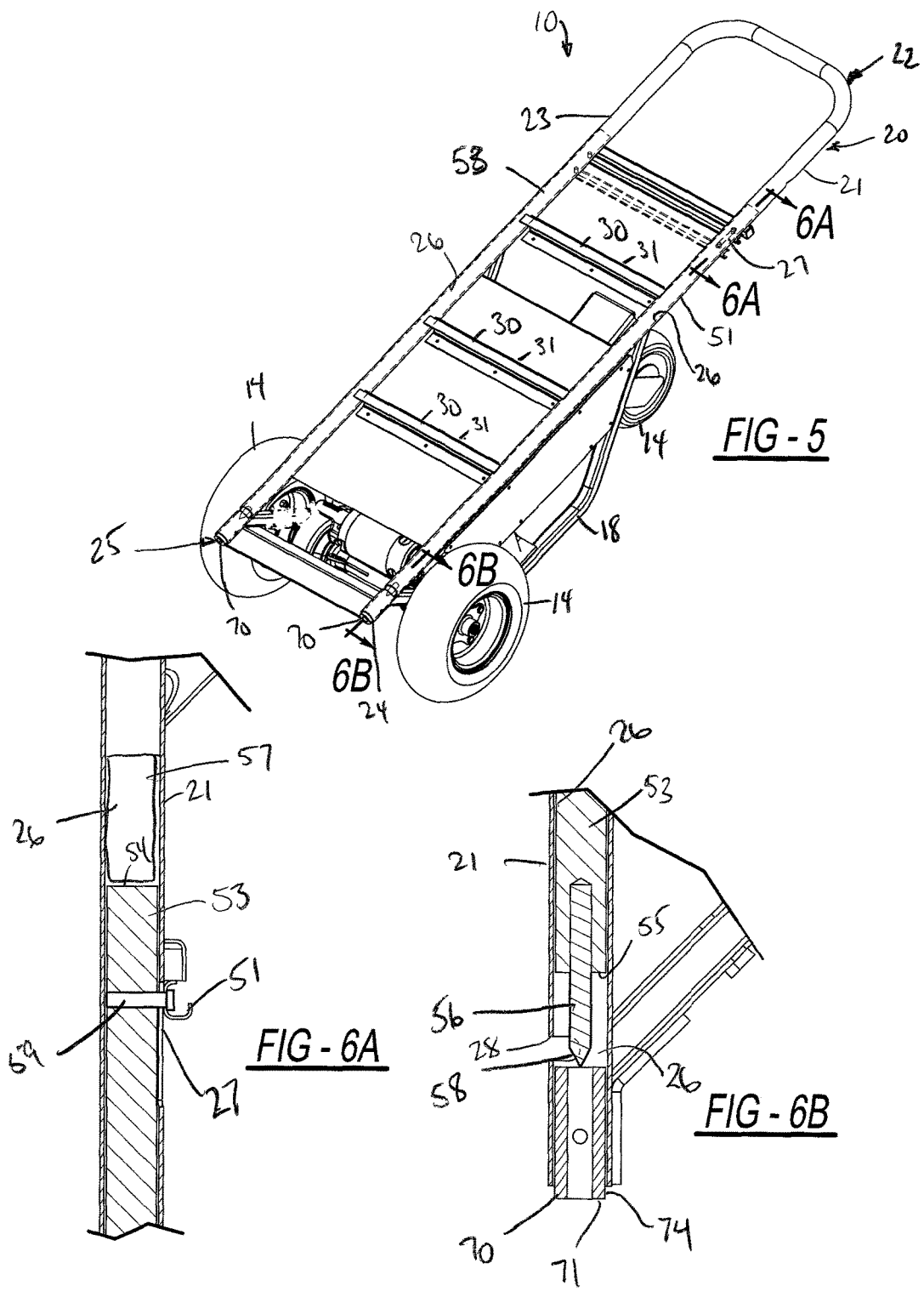

HAND TRUCK EXCHANGEABLE TOOL ATTACHMENT METHOD

CROSS REFERENCE TO RELATED APPLICATION

The present application claims priority to and incorporates by reference herein for all purposes U.S. Patent Application No. 61/973,920, filed Apr. 2, 2014, to Darryl Edward Berlinger and entitled HAND TRUCK EXCHANGEABLE TOOL ATTACHMENT METHOD. The present application also claims priority to, and incorporates by reference herein for all purposes, U.S. patent application Ser. No. 14/677,968, filed Apr. 2, 2015, to Darryl Edward Berlinger and entitled HAND TRUCK EXCHANGEABLE TOOL ATTACHMENT METHOD.

FIELD

The present disclosure relates to light material handling equipment. Light material handling equipment encompasses a wide variety of wheeled carts, trollies and hand trucks (e.g., dollies). These devices are typically manually operated by an operator who pushes or pulls the equipment. There are also motor-assisted (i.e., motorized) devices which may include some type of device or mechanism to propel the device or cart without the operator having to exert a significant (or even zero) effort to cause the device to move.

BACKGROUND

Generally it is known to provide a wheeled device that typically stands vertically on two wheels and has an upper portion to be held by the operator to load carry cargo and to then tilt the loaded cargo and wheel the loaded cargo to a different location. It is also known to provide a hand truck including rear stabilizer wheels which allow the hand truck to be tilted or leaned back and rested on the primary wheels and the rear stabilizer wheels. There are a wide variety of application-specific hand trucks based upon the above generally known designs. Such known application-specific hand trucks may be known as drum dollies (for moving 55-gallon drums), cylinder trucks (for moving high pressure gas cylinders), tree dollies (for moving trees with ball roots), and water dollies (for moving multiple 5-gallon tanks of drinking water) to name only a few. It is generally known that any of these examples may be manually-operated or may be motor-assisted devices.

It is also generally known that there are a vast amount of known hand trucks for many different uses. The known hand trucks vary a great deal and may include simple mechanical clamping mechanisms to secure the load to the truck as well as manual braking devices. It is also further known to provide more complex and motorized hand trucks that can lift and lower loads. There are many adaptations and versions of hand trucks to meet the many varying needs of specific uses or applications since a hand truck may be used in so many ways and in so many industries.

SUMMARY

In one embodiment, a hand truck including a mechanism for providing a quick and easy way to capture, lock and unlock application-specific tools to the hand truck is disclosed.

In one embodiment of the present invention, a cross baron the hand truck is used to hang the tool at the top, with two pins that are slid into receiving tabs at the bottom of the tool attachment to retain and lock it to the truck.

The cross bar(s) and the locking pins are located on the hand truck.

The profile at the top of the tool attachment and the locking tabs at the bottom of the tool attachment mate with the cross bar and locking pins on the hand truck.

BRIEF DESCRIPTION OF THE DRAWINGS

FIG. 5 is a perspective view of the hand truck including the quick release/attach mechanism with the tool removed and the quick release/attach mechanism shown in phantom within a tubular frame of the hand truck.

FIG. 6A is a partial, side view a handle control of the quick release/attach mechanism and the control rod within the tubular upright of the frame of the hand truck taken along the line 6A of FIG. 5.

FIG. 6B is a partial, side view the locking pin and hole of the quick release/attach mechanism and the control rod within the tubular upright of the frame of the hand truck taken along the line 6B of FIG. 5.

DETAILED DESCRIPTION

Figure 1:
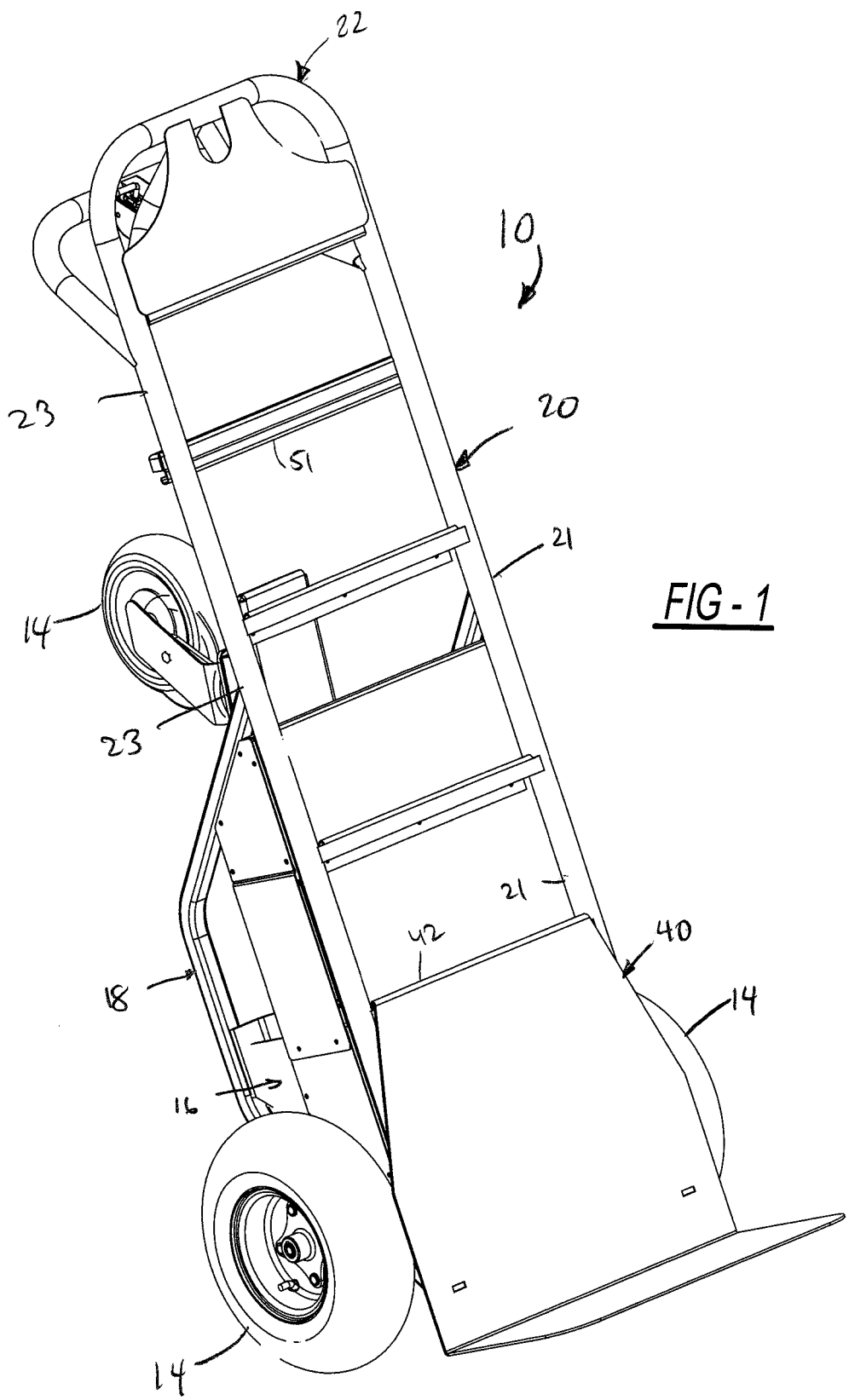
FIG. 1 is a perspective view of a hand truck including a quick release/attach mechanism for quickly attaching and releasing a tool to the hand truck.
Figure 2:
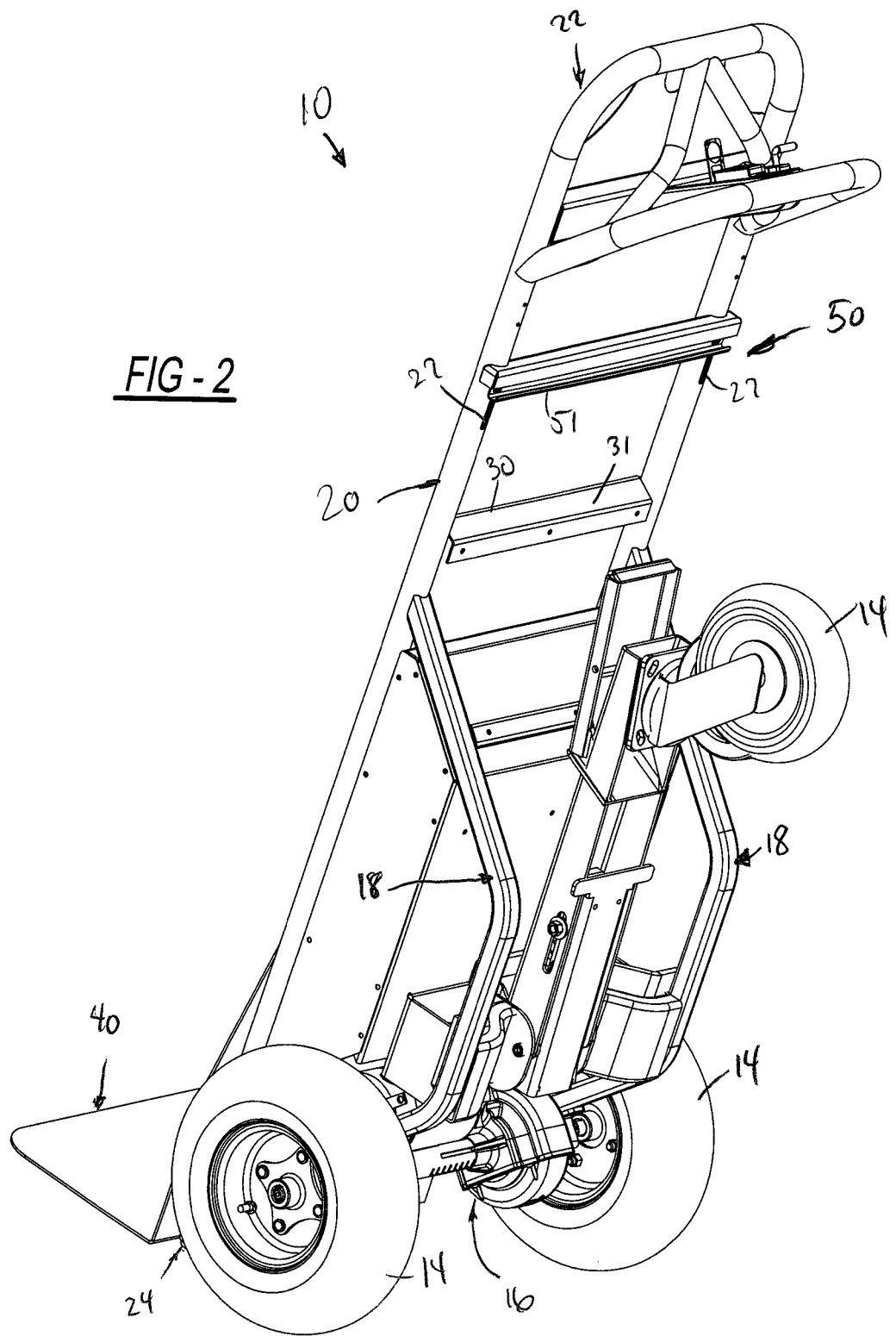
FIG. 2 is an alternate perspective view detailing the quick release/attach mechanism for the hand truck of FIG. 1.

Referring in general to all of the drawings, and in particular to FIGS. 1 and 2, there is disclosed a hand truck 10 having a tubular frame 20, including wheels. 14, a support frame 18 and including a motor 16 and related components as may also be referred to as a wheeled dolly for use in transporting a variety of relatively heavy and/or bulky objects. The hand truck 10 may preferably include a quick release/attach mechanism 50 for relatively easily and quickly attaching and detaching a tool 40 as more fully described herein. The mechanism 50 may include a latching device that is at least partially, and in one embodiment, entirely located within the tubular frame 20 of the hand truck 10 except for an actuator handle 51, supported by the tubular frame 20 as best shown in FIG. 2. The actuator handle 51 may be moved upward (against the force of gravity or against a biasing mechanism such as springs 57 (see FIG. 6A)) and downward with respect to the tubular frame 20 to move the latching mechanism 50 between the unlatched and latched positions for attaching and detaching the tool 40 from the frame 20 of the hand truck 10.

Figure 3:
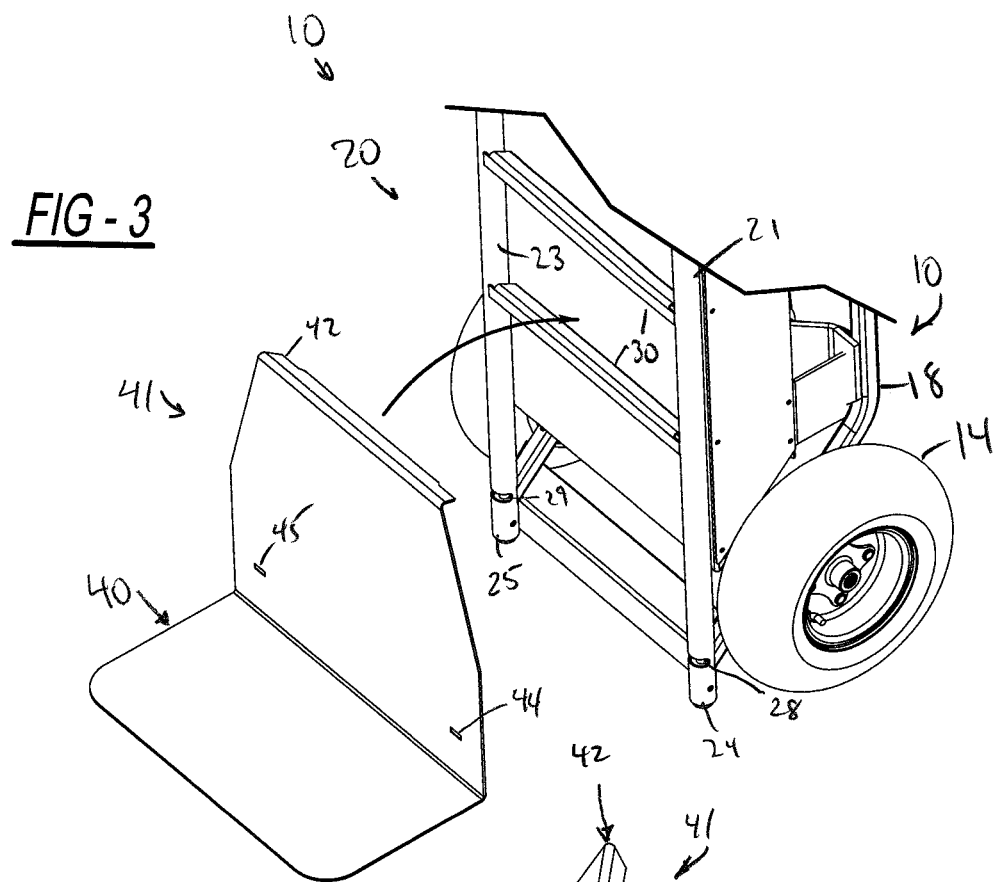
FIG. 3 is a partial perspective view of the hand truck including the quick release/attach mechanism with the tool released from the hand truck.
Figure 4:
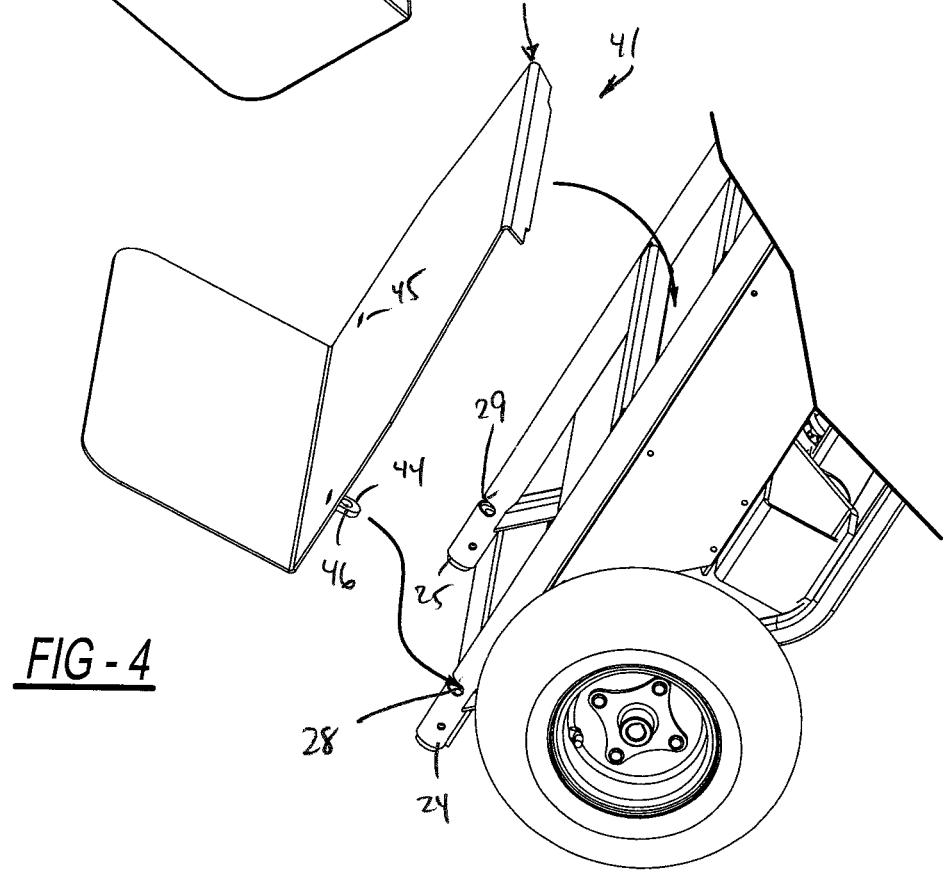
FIG. 4 is an alternate partial perspective view of the hand truck including the quick release/attach mechanism with the tool released from the hand truck.
Figure 7:
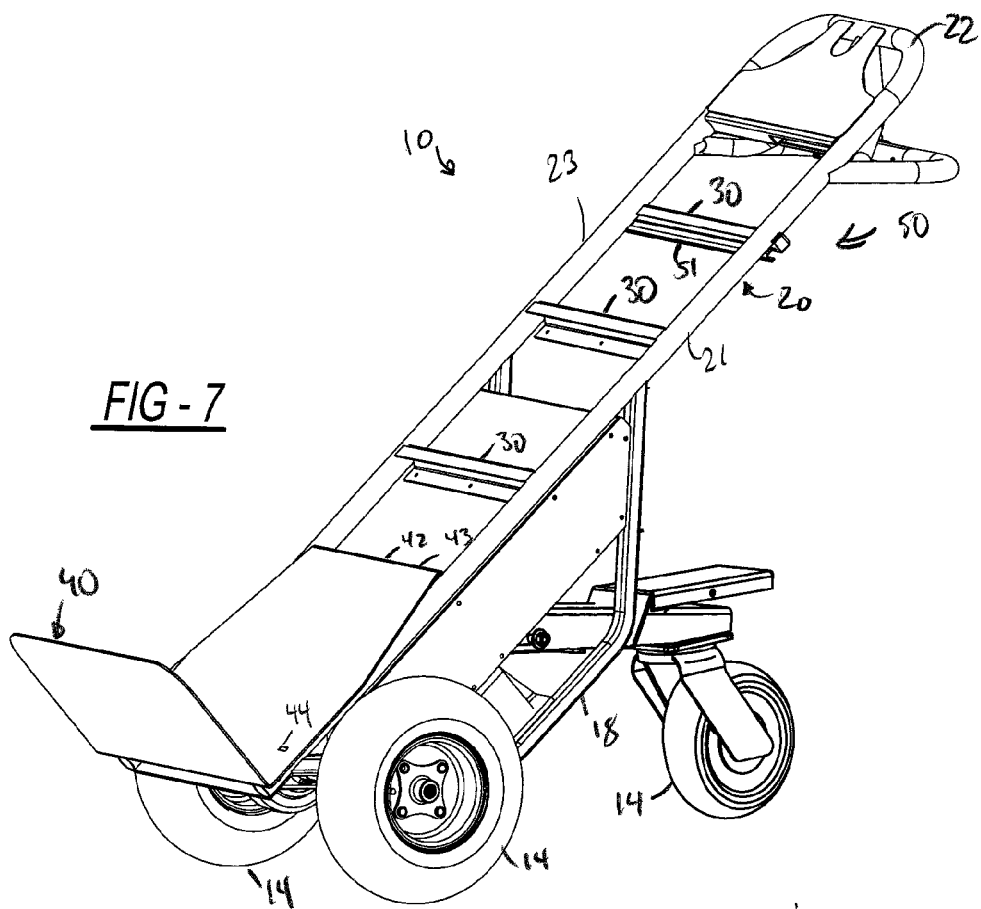
FIG. 7 is a perspective view of the hand truck of FIG. 1 in an alternate position.
Figure 8:
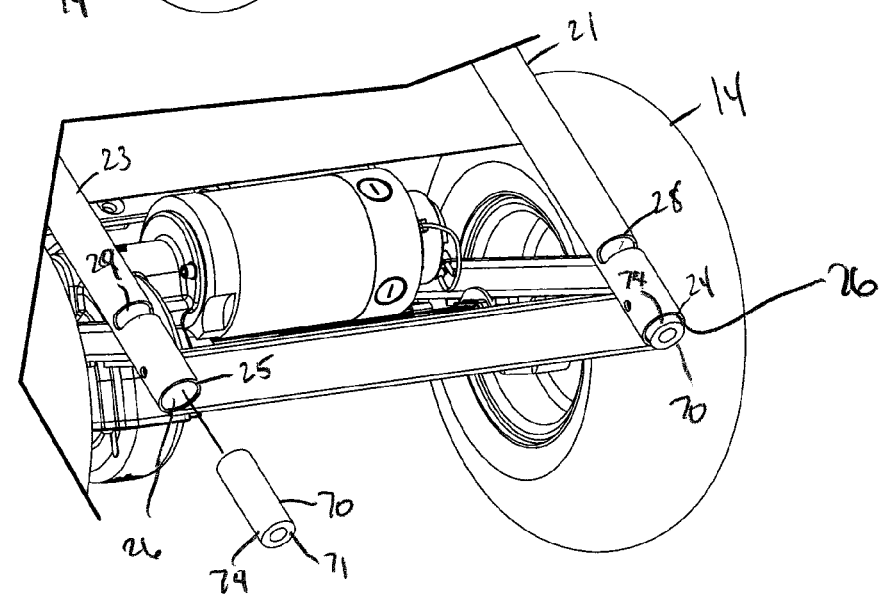
FIG. 8 is an alternate, partial, perspective, partially exploded view of the bottom of the hand truck of FIG. 1 showing the glide members located in the bottom of the upright members of the tubular frame of the hand truck.

The tubular frame 20 of the hand truck 10 may preferably include an upper or handle portion 22 and a first or left side upright tubular frame member 21 and a second or right side upright tubular frame member 23 having a generally U-shaped construction. The tubular frame 20 may preferably be made from a metal material of any known or appropriate type. The tubular frame 20 may preferably also have a generally hollow interior passage 26 (as best shown in FIG. 6A). The first and second upright tubular frame members 21 and 23, respectively, may have any known or appropriate shaped cross-section but, more particularly, may preferably have a round or circular shaped cross-section. Notwithstanding, it is expressly contemplated that the cross-sectional shape of the interior passage 26 may differ from the cross-sectional shape of the outer perimeter of the tubular frame 20. The interior passages 26 of the first and second tubular frame members 21 and 23, respectively, may preferably extend from a portion proximal the upper handle portion 22 to the lower ends 24 and 25, respectively, of the first and second tubular frame members 21 and 23. The latching mechanism 50 of the hand truck 10 may further include first and second passages or holes 28 and 29, located a predetermined distance from the lower ends 24 and 25, respectively, of the first and second tubular frame members 21 and 23 as best shown in FIGS. 3 and 4. Each of the holes 28 and 29 may preferably have a generally horizontal extent and be in communications with the respective interior passage 26 of the first and second upright tubular frame members 21 and 23, respectively, and may be shaped for receiving a respective extension tab or portion 44 and 45 of the tool 40 for being securely received in the respectively passage 26 and for being engaged with the latching mechanism 50.

The latching mechanism 50 may include the handle actuator member 51 which may generally extend horizontally between the first and second upright tubular frame members 21 and 23, respectively. The handle actuator member 51 may be lifted by the operator toward an unlatched position (which is toward the upper handle or control portion 22) for releasing the latching mechanism 50 and releasing the tool 40 from the hand cart 10. When the handle actuator member 51 is not being moved toward the unlatch position 50, the weight of the mass of the components of the latching mechanism weigh the device downward in the interior passages 26 of the first and second tubular frame members 21 and 23, respectively, and toward the latched position.

The latching mechanism 50 may further include a first connector member 53 having a generally longitudinal extent and having an outer cross-sectional shape complimentary of the cross-sectional shape of the interior passage 26 of the tubular frame 20. The first connector member 53 has a first or upper end 54 located proximal the handle actuator member 51, which may be coupled to the handle actuator member 51 using a fastener 59, external of the tubular frame member 21 and extending through a passage 27 (FIGS. 2, 5 and 6A) which has a longitudinal extent of a given distance for setting the limits of travel of the handle actuator member 51 and the first connector members 53. The latching mechanism 50 may further include a second connector member 53 having a generally longitudinal extent and having an outer cross-sectional shape complimentary of the cross-sectional shape of the interior passage 26 of the second upright member 23 of the tubular frame 20. The second connector member 53 has a first or upper end 54 located proximal a handle actuator member 51, which may be coupled to the handle actuator member 51 using a fastener 59, and located external of the tubular frame member 23 and extending through a passage 27 which may extend longitudinally a given distance for setting the limits of travel of the handle actuator member 51 and the second connector member 53. It is expressly contemplated that the latching mechanism 50 may include a biasing mechanism 57 (FIG. 6A), located proximal the upper ends 54 of the connector members 53, to bias or force the connector members 53 downward within the internal hollow passages 26 of the first and second upright tubular frame members 21 and 23, respectively, and to move a lower end 55 of the connector members 53 and a coupling member or pin 56 toward the lower ends 24 and 25 of the thereof first and second upright tubular frame members 21 and 23. Each lower end 55 of the first and second connector members may include the coupling member or pin 56 which may include a leading angled portion or end 58 (FIG. 6B) aligned with a respective passage or opening 28 and 29 in the first and second upright tubular frame members 21 and 23, respectively. It should be understood that while the preferred embodiment of the present disclosure includes first and second connector members 53 located in the first and second upright tubular frame members 21 and 23, respectively, it is expressly contemplated that the latching mechanism 50 may include a single connector member 53 located in either one of the first and second upright tubular frame members 21 and 23, respectively.

Figure 9C:
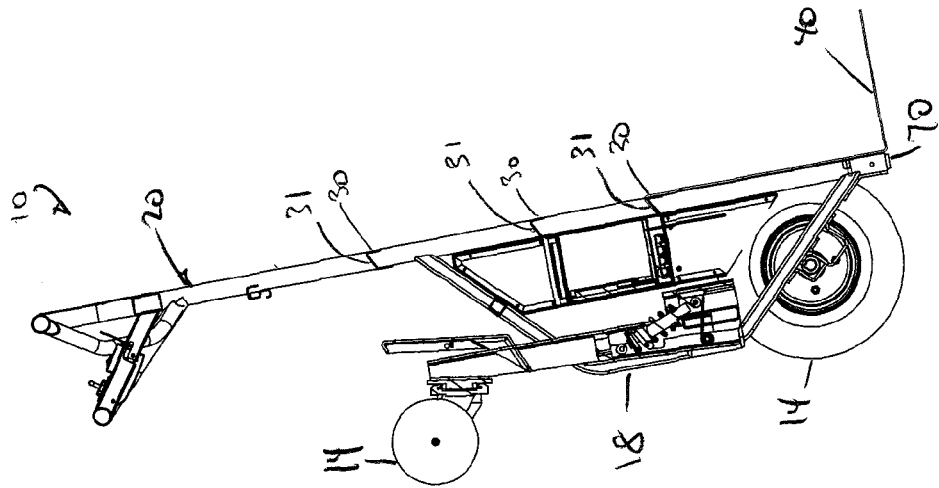
FIGS. 9A-9C are a progression of side views of the hand truck of FIG. 1 showing the method of attaching the tool to the hand truck.
Figure 9B:
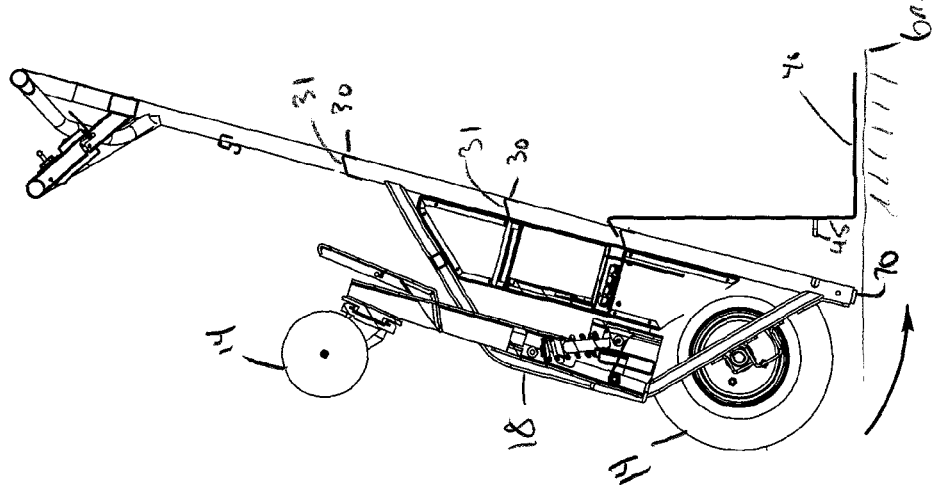
Figure 9A:
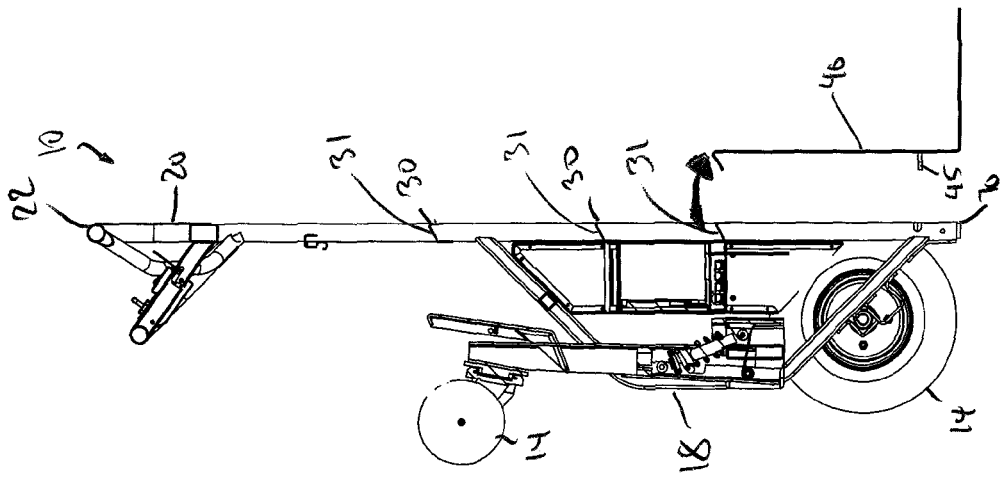

The tubular frame 20 may further include a plurality of shaped, cross-members 30 extending between the first and second upright tubular frame members 21 and 23, respectively. Each shaped cross member 30 may preferably be rigidly coupled or connected to each of the first and second upright tubular frame members 31 and 33, respectively, using any known or appropriate coupling mechanism or technique including, in a particularly preferred embodiment, by welding. Each cross member 30 may preferably include a upper surface 31 extending across the front to rear width of each of the first and second upright tubular frame members 21 and 23, respectively, and being angled with respect to the horizontal cross-section of the first and second upright tubular frame members 21 and 23, respectively. As best shown in FIGS. 9A-9C, the upper surface 31 may preferably be angled with respect to the perpendicular cross-section of the tubular upright frame members 21 and 23, respectively, at an angle of approximately 30°. The upper surface 31 may preferably be angled with respect to the perpendicular cross-section of the tubular upright frame members 21 and 23, respectively, at an angle of between approximately 25° and approximately 35° for providing a geometric cross-sectional profile of the cross member 30, for improving the method of attachment of the tool 40 to the tubular frame 20 in a manner using no tools and a minimalized amount of effort and motion by an operator. It may be noted that the angled geometry and profile of the cross members 30 support the ability of the hand truck 10 to be tilted forward to catch the top of the tool 40 to provide a more efficient, effective and easy attachment and detachment of the tool 40 with the hand truck 10 according to a method of operating (attaching and detaching the tool 40 with) the hand truck 10 of the present disclosure using the quick release/attach mechanism 50.

The hand truck 10 may further include the tool 40 as best shown in FIGS. 3, 4 and 9A-9C. The tool 40 may be usable with a variety of objects to be transported by the hand truck 10. The tool 40 has a standardized geometry and coupling 41 for quickly, efficiently and effectively attaching and detaching (releasing) the tool 40 with the frame 20 of the hand truck 10. In particular, proximal the portion of the tool 40, there is provided a hangar member 42 for hanging the tool 40 from the cross members 30 of the frame 20 of the hand cart 10. The hangar member 42 may preferably include an angled surface portion 43 designed to be complementary of the upper surface 31 of the cross-member 30 for hanging the tool 40 a cross member 30 and providing a first engagement point for the coupling of the tool 40 and the hand truck 10. As best shown in FIGS. 9A-9C, the angled surface portion 43 of the tool 40 may preferably be angled with respect to a horizontal, perpendicular cross-section of the tubular upright frame members 21 and 23, respectively, at an angle of approximately 30° with respect thereto. The angled surface portion 43 may preferably be angled with respect to the horizontal, perpendicular cross-section of the tubular upright frame members 21 and 23, respectively, at an angle of between approximately 25° and approximately 35° for providing the coupling portion 41 of the quick release/attach mechanism 50 of the hand truck 10.

To provide a second engagement point for coupling the tool 40 and the hand truck 10, the tool 40 may further include first and a second extension or projection tabs 44 and 45, respectively, located a predetermined distance from the hangar 42 of the tool 40 The tool 40 may preferably include a hangar portion 42 located proximal a first portion of the tool 40. Together, the hangar portion 42 and the first and second projection tabs 44 and 45, respectively, form the coupling portion of the tool 40. The first and second projection tabs 44 and 45, respectively, are located a corresponding predetermined distance as that of one of the cross-members 30 and the first and second passages 28 and 29 of the first and second upright tubular frame members 21 and 23, respectively. Accordingly, when the tool 40 is hung on a cross-member 30 of the frame 20, the first and second projection tabs 44 and 45 will align with and pass into the first and second passages 28 and 29. Each of the first and second projection tabs 44 and 45 include a centrally-located locking hole or passage 46 (see FIGS. 4, 9A and 9B).

The quick release/attach mechanism 50 may further include a first and second glide members 70 located in the lower ends 24 and 25 of the first and second upright frame members 21 and 23, respectively, as best shown in FIGS. 5, 6B, 8, and 9A-9C. Each glide member 70 may include a lower end 71 including a portion 74 extending from the ends 24 and 25 of the first and second upright frame members 21 and 23 for providing a ground engaging end portion 71 having a lower coefficient of friction than the material of the frame 20 and for making it easier to move the frame 20 of the hand truck 10 along a ground surface as best shown in the progression of views in FIGS. 9A through 9C showing the attachment method for coupling the tool 40 to the hand truck 10.

In one method of attaching the tool 40 to the hand truck 10, it should be noted that the geometry/profile of each of the cross members 30 also allows the hand truck 10 to be tilted forward (FIG. 9A) to catch the top coupling portion 41 including the hangar portion 42 of the tool 40 and to then move the lower end of the hand truck 10 by gliding or sliding the gliding members 70 of the first and second upright frame members 21 and 23 of the frame 20 in an opposite rotational movement of the hand truck 10 (see the arrow in FIG. 9B) so that the lower ends 24 and 25 of the frame members 21 and 23 move the openings 28 and 29 thereof move toward the first and second extension members 44 and 45 which may be received therein to allow the attachment extension members 44 and 45 to move into position the locked position (FIG. 9C) and to move the latch pins 56 of the connector members 53 upward in the hollow interior passages 26 of the first and second upright tubular frame members 21 and 23 so that the locking pins move out of the way and then are moved into and located in the holes or passages 46 of the first and extension members 44 and 45 of the tool 40 to efficiently, effectively and quickly secure the tool 40 to the hand truck 10.

To detach or unlock the tool 40 from the hand truck 10, the operator may actuate the quick release/attach mechanism 50 by moving the handle member 51 upward to retract the connector members 53 and to retract the locking or latch pins 56 from the holes or passages in the first and second projection or extension members 44 and 45 of the tool by the action of the operator.

Figure 10:
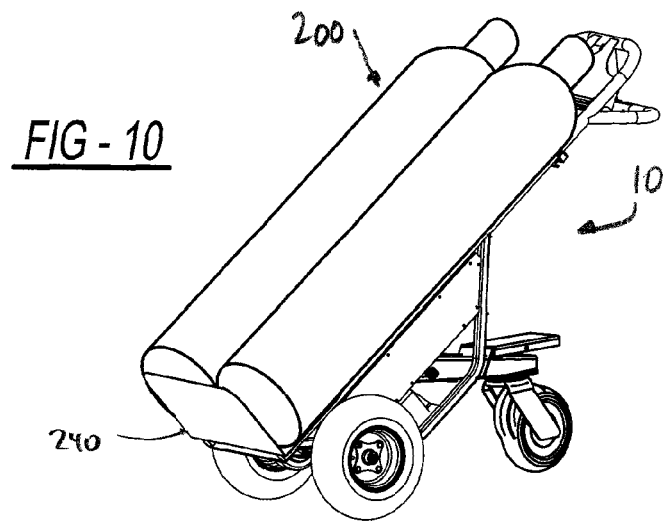
FIG. 10 is a perspective view of a hand truck including a quick release/attach mechanism for quickly attaching and releasing a tool to the hand truck for use with a tool for carrying gas cylinders.
Figure 11:
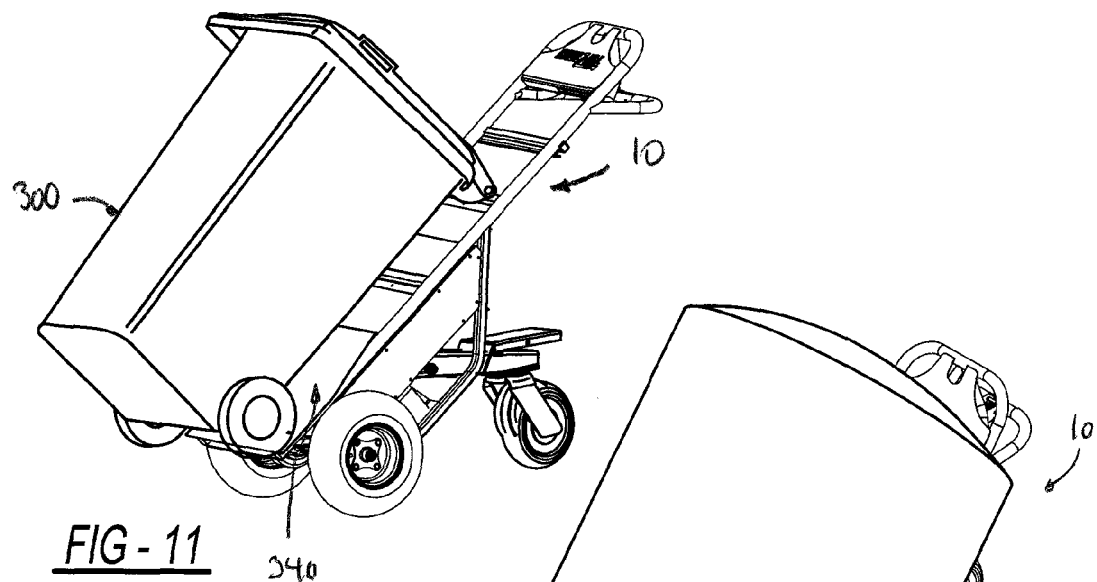
FIG. 11 is a perspective view of a hand truck including a quick release/attach mechanism for quickly attaching and releasing a tool to the hand truck for use with a tool for carrying a large bin such as a trash bin.
Figure 12:
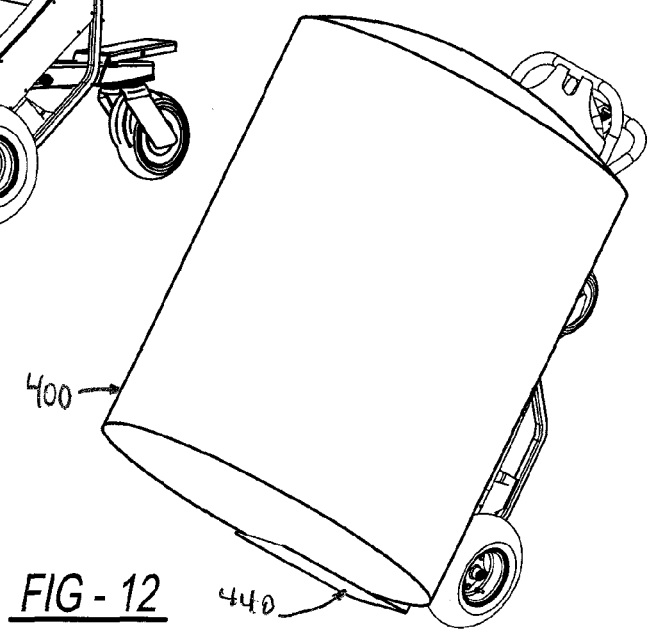
FIG. 12 is a perspective view of a hand truck including a quick release/attach mechanism for quickly attaching and releasing a tool to the hand truck for use with a tool for carrying an inflatable.

The tool 40 attachments are specifically designed so that the top 42 of the tool 40 matches the cross-sectional profile 31 of the specifically designed cross bars 30 on the hand truck 10. The quick release/attach mechanism 50 may further include the angled cross-section of the cross member 30 which supports the ability to quickly and efficiently attach and detach a variety of tools 40 without any need of the operator to move, pickup, or otherwise handle the tool 40. These features of the hand truck 10 including the tubular frame 20 and the cross member 30 in combination with the quick release/attach mechanism 50 significantly help in providing a more efficient, effective and safe method of attaching and detaching the tool 40 to a hand truck 10. Notably, the quick change hand truck 10 and tool 40 may provide a significantly greater ability to utilize a standardized or common hand truck 10 of the present disclosure with a variety of tools 240, 340, 440 that may be customized for transporting a plethora of loads such as the gas cylinders 200 of FIG. 10, the bin 300 of FIG. 11 and the inflatable container 400 of FIG. 12.

What is claimed is:

1. A method of attaching a tool to a wheeled hand truck, the hand truck having a tubular frame member, the hand truck comprising a quick release/attach mechanism for quickly attaching and detaching a tool to the hand truck wherein the quick release/attach mechanism includes a latching device at least partially located within the tubular frame of the hand truck and including an actuator handle supported by the tubular frame and coupled internally of the tubular frame to the latching device, wherein the tubular frame including first and second upright members each having an interior passage and wherein the quick release/ attach mechanism comprises first and second latching pins slidably located in a respective interior passage of the first and second upright members of the tubular frame and wherein the tubular frame further comprises first and second holes extending through the tubular frame and in communication with a respective internal passage and located proximal the respective latching pin, the tubular frame further comprising a plurality of cross members each located a different predetermined distance from the holes in the tubular frame, the cross members each having a shaped cross section for coupling the tool to the hand truck and wherein the tool includes a hook member having a matching shaped cross-section for engaging the shaped cross-section of the cross member and first and second attachment projections located a predetermined distance from the hook member and wherein the hand truck further includes first and second glide members each at least partially inserted in a respective lower end of the first and second upright members such that at least a portion of each glide member may engage the ground when the tool is detached from the hand truck, the method comprising the steps of:

positioning the hand truck proximal the tool;

rotating the hand truck about the wheels of the hand truck in a first direction to position the shaped cross member to engage the hook of the tool so the tool hangs from the cross member of the hand truck; and after the tool hangs on the cross member of the tubular frame, gliding the hand truck on the ground and rotating the hand truck in a second direction to move the tool to align with and be coupled to the hand truck as the attachment projections of the tool move into each hole in each upright member and then engage the first and second latching pins located in the internal passage of the upright members.

2. The method of claim 1 further comprising the step of actuating the actuator handle to remove the slidable pins from the attachment projections of the tool to detach the tool from the hand truck.

* * * * *